2,808,676

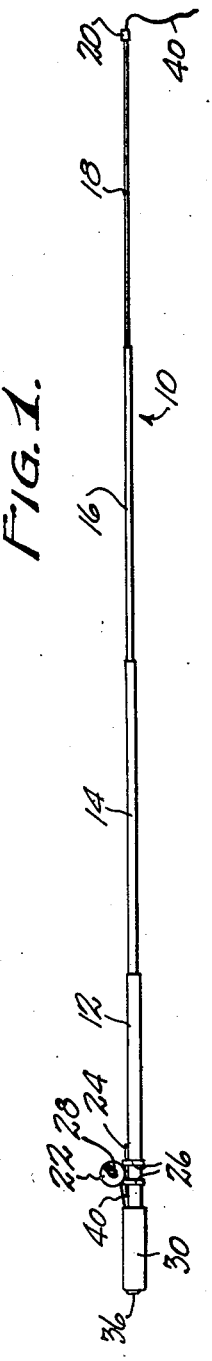

TELESCOPING FISHING ROD WITH LINE GUIDE

William A. Major, South Bend, Ind.

Application September 26, 1955, Serial No. 536,418

1 Claim. (Cl. 43—23)

This invention relates to a telescopic fishing rod with line guide.

The primary object of the invention is to provide a device of this character so constructed as to mount a fishing reel and to guide a line from that reel through the rod in both extended and collapsed position, and thereby confine the line and protect the same against whipping in the wind during use.

A further object is to provide a telescopic tubular fishing rod with an end cap mounted at one end thereof and serving to confine sections of the rod, said cap constituting a hand grip and being provided with a line-guiding tube for a line extended from an external position to enter the rod in register with the innermost rod section.

Other objects will be apparent from the following specification.

In the drawing:

Fig. 1 is a view of the rod in its extended position ready for use; and

Fig. 2 is an enlarged fragmentary longitudinal sectional view of the rod in collapsed form.

Referring to the drawing which illustrates the preferred embodiment of the invention, the numeral 10 designates a telescopic fishing rod or pole composed of a plurality of telescopically interfitting tubular sections 12, 14, 16 and 18. The tubular sections are preferably formed of plastic reinforced with fiber glass although they may be formed of metal tubing or any other suitable material. Each of the sections 12, 14, 16 and 18 is tapered at least at the opposite ends thereof, and preferably is uniformly tapered throughout its full length. The arrangement of parts and their relative proportions are such that the length of each section is substantially the same, and the outer dimension of the large end of each of the sections 14, 16 and 18 is slightly greater than the minimum inner dimension of each of the sections 12, 14 and 16, respectively. The taper of the rod sections is gradual so that the diameter of the rod at the largest section can be held to a small size, for example, a size not greatly in excess of one inch, and still provide a releasable frictional telescopic interfit. The wall thickness of the sections is also held as thin as feasible to provide the necessary flexibility of the pole for its intended purpose and also provide minimum total weight. Rods of this character made of plastic reinforced with fiber glass are well known on the market and are characterized by substantial strength and rigidity when extended, a firm frictional grip at the joints, and sufficient flexibility for effective use in fishing.

In order to insure a smooth line-engaging surface at the tip of the rod, I prefer to provide a tubular member 20 mounted upon the tip of the small end section 18 with its bore substantially the same diameter as that of the end of section 18.

The large diameter or outer telescoping tube section 12 may have a fishing reel 22 mounted thereon by any suitable means. Thus the base plate 24 of the fishing reel may be anchored in place by rings or retainer members 26 passed around the rod and having a wedged fit around the rod and the reel base plate 24. The reel will be of any suitable construction, and will have an operating crank 28 if it is a bait casting or spinning rod, or will be of the automatic line-retrieving construction if it is a fly casting rod.

The large diameter end of the outer section 12 of the telescoping rod mounts a cup-shaped member including a tubular portion 30 and an end wall 32. The cup-shaped end member 30, 32 is of any length or axial dimension found necessary, and preferably the tubular portion 30 thereof is sufficiently long to provide a hand grip. The cup-shaped member 30, 32 serves as a means to mount an open ended tubular line guide having a portion 34 extending lengthwise of the rod, a cross portion 36 extending transversely, and an inner end portion 38 also extending substantially lengthwise of the rod. As here shown, the portion 34 of the guide is imbedded within the tubular wall portion 30, and the part 38 passes through the end wall 32 of the cup-shaped butt member 30, 32. This arrangement is not essential and, if desired, the hand grip may be so configured that portions of the run 34 of the guide are imbedded in projections of wall 30 as required for purposes of positioning and orienting the parts. In the preferred form, the opposite ends of the guide tube parts 34—38 will be flared to facilitate sliding of the line into and out of the guide.

The fishing reel is so mounted that the line, monofilament or other strand 40 to which a hook (not shown) is to be connected and which has been wound upon the reel in the conventional manner, will extend rearwardly from the reel, and thence will pass through the line guide 34, 36, 38 to enter the interior of the telescoping rod. The portion 38 will preferably be positioned near the center of the telescoping rod and at such a position that the line may extend freely through the rod to the tip 20 in both the extended and the collapsed positions of the rod. The rod thus serves as a sheath confining the line so that it is substantially free from disturbance by the wind during fishing, and only the short portion of the line between the reel 22 and the guide tube 34 and the portion of the line between the pole tip and the surface of the water, are subject to or exposed to the effects of wind. As the pole is telescoped or collapsed, the reel may be operated to take up the line so that there will not be any fouling or kinking or knotting of the line. As the telescoping rod is extended, the line may be pulled together with the tip 18 to compensate for the elongation of the rod from collapsed to extended position. The hand grip will preferably be molded from rubber or plastic material to form a comfortable grip, and the line-guiding tube 34, 38 may be molded or imbedded therein as the hand grip is formed. The snug or constrictive fit of a rubber or plastic elastic member 30—32 upon rod part 12 is preferred to facilitate removal of the member and to accommodate replacement of a rod section or threading of a line through the rod and the guide, but the member 30—32 may be cemented or otherwise fixedly or permanently secured, if desired. The tubular character of the line guide 34, 36, 38 insures a smooth substantially uniform passage for the line to avoid injury to or cutting of the line. Also the tubular guide accommodates extension of the line rearwardly from the reel and then inwardly and forwardly to pass through the rod without binding, kinking or other interference with free endwise movement of the line during retrieving and line play-out resulting from said reverse bending thereof between the reel and the interior of the rod.

This rod is primarily designed and intended for use in still fishing or trolling. However, it may be used for fly casting also. A cup-shaped member 30, 32 may be used on a single section tubular rod for bait casting or casting with a spinning reel, if desired.

While the preferred embodiment of the invention has been illustrated and described, it will be understood that changes in the construction may be made within the scope of the appended claim without departing from the spirit of the invention.

I claim:

A line guide for a telescopic fishing rod having a plurality of telescoping tubular sections, comprising a cup-shaped rubber hand grip member adapted to be mounted on one end of the outermost rod section, and a tubular line guide carried by and extending through said member for leading a line into the rod to extend therethrough, said line guide being U-shaped and including longitudinal external and inner portions, both at least partially imbedded in said member.

References Cited in the file of this patent

UNITED STATES PATENTS

| | | |
|---|---|---|
| 359,153 | Horton | Mar. 8, 1887 |
| 670,961 | Lenharth | Apr. 2, 1901 |
| 706,225 | Ekelund | Aug. 5, 1902 |
| 2,334,646 | Price | Nov. 16, 1943 |
| 2,697,564 | Haney et al. | Dec. 21, 1954 |